United States Patent
Zhong et al.

(10) Patent No.: US 12,524,611 B2
(45) Date of Patent: Jan. 13, 2026

(54) TRAINING GRAPH NEURAL NETWORK TO IDENTIFY KEY-VALUE PAIRS IN DOCUMENTS

(71) Applicant: Oracle International Corporation, Redwood Shores, CA (US)

(72) Inventors: Xu Zhong, Vermont South (AU); Thanh Long Duong, Point Cook (AU); Mark Johnson, Castle Cove (AU)

(73) Assignee: Oracle International Corporation, Redwood Shores, CA (US)

( * ) Notice: Subject to any disclaimer, the term of this patent is extended or adjusted under 35 U.S.C. 154(b) by 250 days.

(21) Appl. No.: 18/161,696

(22) Filed: Jan. 30, 2023

(65) Prior Publication Data

US 2024/0256771 A1 Aug. 1, 2024

(51) Int. Cl.
*G06F 40/253* (2020.01)
*G06F 40/211* (2020.01)
*G06N 3/08* (2023.01)

(52) U.S. Cl.
CPC .......... *G06F 40/253* (2020.01); *G06F 40/211* (2020.01); *G06N 3/08* (2013.01)

(58) Field of Classification Search
CPC ....... G06F 40/253; G06F 40/211; G06N 3/08; G06N 3/045
See application file for complete search history.

(56) References Cited

U.S. PATENT DOCUMENTS

| | | | |
|---|---|---|---|
| 8,412,514 B1 | 4/2013 | Feng et al. | |
| 2023/0169101 A1* | 6/2023 | Yuan | G06N 3/045 |
| | | | 707/722 |
| 2023/0367800 A1* | 11/2023 | Tong | G06F 16/35 |
| 2024/0062041 A1* | 2/2024 | Choudhary | G06N 3/042 |

FOREIGN PATENT DOCUMENTS

| | | |
|---|---|---|
| CN | 112380835 A | 2/2021 |
| CN | 113743079 A | 12/2021 |
| CN | 114912457 A | 8/2022 |

(Continued)

OTHER PUBLICATIONS

Cong et al., "Finding Question-Answer Pairs from Online Forums", SIGIR '08: Proceedings of the 31st annual international ACM SIGIR conference on Research and development in information retrieval, 2008, pp. 467-474.

(Continued)

*Primary Examiner* — Bhavesh M Mehta
*Assistant Examiner* — Jangwoen Lee
(74) *Attorney, Agent, or Firm* — Invoke

(57) ABSTRACT

Techniques for identifying content in key-value pairs of documents using a graph neural network (GNN) are disclosed. A system trains a GNN to identify key-value pair groupings in documents. The GNN classifies nodes in document graphs as key-type nodes and answer-type nodes. The GNN also classifies edges connecting nodes in the document graphs for keeping in the document graph or removing from the document graph. The resulting document graph includes key-value groupings in the document. Upon identifying content matching a query, a system returns as a query response content from among the key-value groupings.

21 Claims, 6 Drawing Sheets

(56) References Cited

FOREIGN PATENT DOCUMENTS

WO  WO-2023077995 A1 * 5/2023 ......... G06F 18/2431

OTHER PUBLICATIONS

Gal et al., "Cardinal Graph Convolution Framework for Document Information Extraction", DocEng '20: Proceedings of the ACM Symposium on Document Engineering 2020, 2020, pp. 1-11.
Jijkoun et al., "Retrieving Answers from Frequently Asked Questions Pages on the Web", CIKM'05, 2005, pp. 8.
Yoon et al., Propagate-Selector: Detecting Supporting Sentences for Question Answering via Graph Neural Networks, Proceedings of the 12th Conference on Language Resources and Evaluation (LREC 2020), May 2020, pp. 5400-5407.

* cited by examiner

TRAINING GRAPH NEURAL NETWORK TO IDENTIFY KEY-VALUE PAIRS IN DOCUMENTS

TECHNICAL FIELD

The present disclosure relates to training a graph neural network to identify key-value pairs in documents. In particular, the present disclosure relates to using a trained graph neural network to identify content relevant to query requests in question-answer groupings in documents.

BACKGROUND

Electronic documents, such as frequently-asked-question (FAQ)-type documents, include text in a human-readable format. Some portions of the text include questions, while other portions of the text include answers to the questions. Applications may search electronic documents to identify content within the electronic document that matches query terms. The applications may display portions of the text in the FAQ-type documents, in response to queries. Displaying portions of content requires an application to extract content from a document, determine content characteristics, such as language and read-order, and reproduce content consistent with the content characteristics. FAQ-type documents come in many different types of formats. For example, questions may be arranged above answers, to the left side of answers, or to the right side of answers. Questions may have the same, or different, formatting than the corresponding answers. Given the many different styles and formats of FAQ-type documents, applications have difficulty identifying which content in the document corresponds to an answer to a particular question. For example, one type of application may utilize a sequential-type machine learning model which identifies related content based on its read order in a document. However, since many FAQ-type documents include answer content arranged non-sequentially relative to its question, sequential-type machine learning models incorrectly identify question/answer pairs in many FAQ-type documents.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
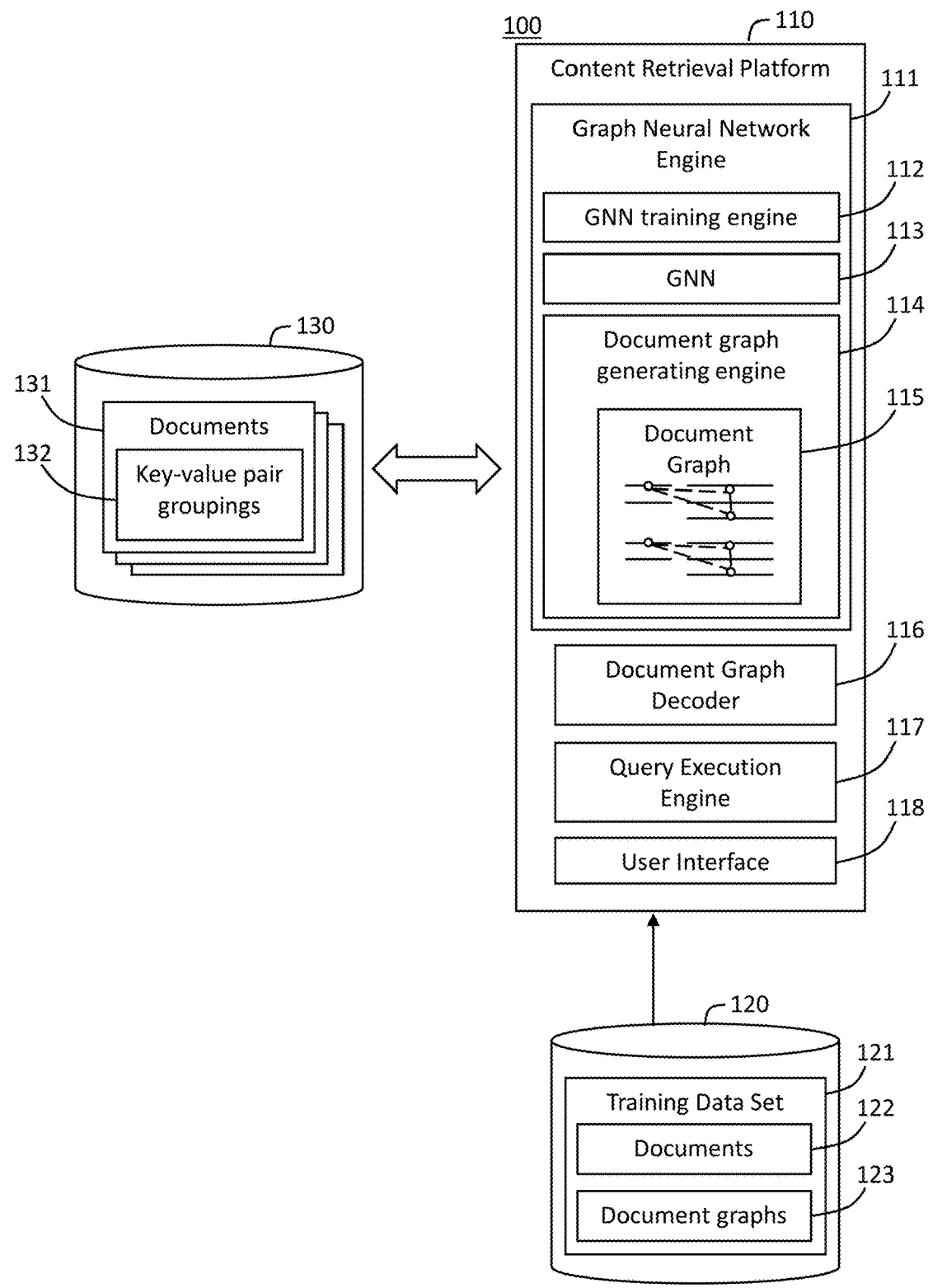
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. IDENTIFYING KEY/VALUE PAIR GROUPINGS IN DOCUMENTS USING A GRAPH NEURAL NETWORK
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

One or more embodiments apply a graph neural network (GNN) to identify key-value pairs in a target document. During a training phase, a system generates document graphs representing sentences within training documents. Nodes of the document graphs represent sentences and edges of the document graphs represent relationships between the sentences. The attributes of a node may represent the attributes of sentences such as content, format, font, spacing, location within a document, bounding box coordinates, etc. The attributes of an edge may represent the relationship between sentences that are represented by the nodes that are connected by the edge. As examples, an edge may indicate that two sentences, represented by the nodes connected by the edge, form a key-value pair, have a similar font, or have a distance of x between the sentences' bounding boxes. An edge may indicate a read-order for a pair of sentences represented by the nodes connected by the edge. The system trains the GNN based on the document graphs representing the training documents and the key-value labels that identify sentences as key-value pairs. During an application phase, the trained GNN may be applied to a target document graph that represents a target document. The trained GNN may be applied to vectors representing the nodes and edges within the target document graph. The application of the trained GNN results in the trained GNN predicting key-value pairs of sentences within the target document.

One or more embodiments identify key-value pairs, or question-answer pairs in a document by using a graph neural network (GNN) to classify sentences in the document as key/question-type content or value/answer-type content. A system generates a document graph that represents sentences within the document as nodes. Node attributes may correspond to sentence content as well as additional embedded information, such as font style and node location within the document. The document graph includes edges connecting the nodes. The edges include information describing a relationship between two nodes, such as a difference in font style, a difference in coordinate location, and a difference in read-order location between the two nodes. The GNN analyzes the document graph to classify nodes and edges. The GNN classifies the nodes as key-type nodes or value-type nodes. For example, the GNN may classify a node as a question-type node and another node as an answer-type node. The GNN further classifies the edges to identify key-value groupings. The GNN determines which edges connect nodes of a key-value pair grouping, and which edges do not.

One or more embodiments generate the document graph including node embeddings and edge embeddings. The node embeddings are made up of vectors representing properties of sentences in a document. The edge embeddings are made up of vectors representing the relationships between two nodes in the document. The GNN receives the set of embeddings for a document as input data and generates as output data classifications for nodes and edges. The system generates the document graph with an initial set of edges connecting nodes, e.g., based on coordinate distance between the nodes and relative read order between nodes. Based on the GNN classifications, the system removes edges from the document graph to separate from each other nodes corresponding to question-answer groupings associated with different questions.

One or more embodiments return value-type content from a key-value grouping in response to identifying content matching query terms in the key-type content. For example, a system may receive a query including query terms. The system identifies content in a document that matches the query terms. The system identifies the content as part of a question-answer pair grouping. For example, the query terms may include "distance from Sydney to Melbourne." The system identifies, in a question of a FAQ document, the terms "how," "far," "Sydney," "Melbourne." The system identifies, based on a GNN classification of sentences within the document, a question-answer grouping of sentences corresponding to the question, "How far is it from Sydney to Melbourne?" The system identifies multiple answer sentences, including a sentence describing a distance by plane and a sentence describing a driving distance. The system identifies the multiple answer sentences associated with the question sentence based on nodes in a document graph representing the document being connected by edges in the document graph. The system returns, in response to the query, one or both of the answer-type sentences corresponding to the question sentence that contains the content matching the query terms.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a content retrieval platform 110. The content retrieval platform 110 may be implemented as a digital assistant, for example. Users may interact with the digital assistant via the user interface 118 to generate queries. For example, a user may speak or type a question. The query execution engine 117 parses the question to identify query terms. The query execution engine 117 identifies documents 131 in a data repository 130 having words matching the query terms. In addition, or in the alternative, the content retrieval platform 110 may be implemented as an application running on a computing device, or a bot.

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the content retrieval platform 110. Alternatively, or additionally, a data repository 130 may be implemented or executed on a computing system separate from the content retrieval platform 110. A data repository 130 may be communicatively coupled to the content retrieval platform via a direct connection or via a network.

Information describing documents 131 may be implemented across any of components within the system 100. However, this information is illustrated within the data repository 130 for purposes of clarity and explanation.

The content retrieval platform 110 includes a graph neural network (GNN) engine 111. The GNN engine 111 trains a GNN to identify key-value pairs in documents. According to an alternative embodiment, the content retrieval platform 110 includes any machine learning model that analyzes graph-type data to identify key-value pairs in documents. For example, the content retrieval platform 110 may include a graph convolutional network (GCN) engine that trains a GCN to identify key-value pairs in documents. A document graph generating engine 114 generates a graph 115 from a document 131. The document graph generating engine 114 identifies defined grammatical structural elements in the document. The document graph generating engine 114 generates a node for each defined grammatical structural element. According to one embodiment, the defined grammatical structural element is a sentence. In other words, the document graph generating engine 114 generates a separate node for each sentence in the document. In addition, the document graph generating engine 114 generates a node for grammatical elements in the document that are not part of a sentence or paragraph structure, such as: a page number, a date, a web address, a document title, a document subtitle, and a list of items in non-sentence format.

The document graph generating engine 114 generates edges connecting the nodes. The document graph generating engine 114 generates an initial set of edges based on distances between nodes. For example, the document graph generating engine 114 may generate edges between any two nodes within a defined distance of each other in the document, such as within 100 pixels of each other. According to one example, the document graph generating engine 114 compares a coordinate position of a particular node with the coordinate positions of nodes located above, below, and to the sides of the particular node. If the nodes are within a predefined distance of each other, in the horizontal and/or vertical directions, the document graph generating engine 114 generates an edge connecting the nodes.

In addition, or in the alternative, document graph generating engine 114 may generate edges between any two nodes within a defined reading order of each other. For example, the document graph generating engine 114 may set a reading order threshold to 2. From a center node, the document graph generating engine 114 generates an edge between the center node and (a) an immediately preceding node in a reading order, (b) a node preceding the immediately preceding node in the reading order, (c) an immediately following node in the reading order, and (d) a node following the immediately following node in the reading order. According to one example, document graph generating engine 114 logically combines the reading order requirement and the position of the node requirement to determine whether to generate an edge. For example, document graph generating engine 114 may generate an edge between any two nodes that are (a) within two nodes of each other in reading order, and (b) within a predefined distance of each other in a coordinate system. According to one embodiment, determining a position of a node within a document includes determining, in a coordinate system, (a) a position of a right edge of the grammatical element corresponding to the node, (b) a position of a left edge of the grammatical element corresponding to the node, (c) a position of a bottom edge of the grammatical element corresponding to the node, and (d) a position of a top edge of the grammatical element corresponding to the node.

The nodes and edges are embeddings comprising n vectors for the nodes and m vectors for the edges. Values represented by vectors in the nodes include text content, font weight (such as regular, italic, bold, combinations of bold and italic, etc.), and the location in the page of the sentence (such as the coordinates corresponding to the left, right, top, and bottom edges of the sentence in the document). Edges represent relationships between nodes. Values represented by vectors in the edges include relative relationships between: font size (is a font size of one node greater, equal to, or less than the font size of the other node), font color (is the font size of one node the same, or different from, the font size of the other node), a page (are two nodes on the same page or different pages), a relative reading order of the nodes (is one node in a reading order position preceding, or following, the other node), and a relative layout of the nodes (what is the difference between (a) the left edges of the nodes, (b) the right edges of the nodes, (c) the tops of the nodes, and (d) the bottoms of the nodes, and what are the horizontal and vertical distances between the nodes (e.g., what is a difference between the left side of one node and the right side of the other node)).

The GNN engine 111 applies a GNN 113 to the document graph 115 to identify key-value pair groupings 132 in the document 131. In particular, the GNN 113 (a) receives as input data the embeddings for the nodes and edges in the document graph 115, and (b) generates embeddings comprising vectors identifying key-value groupings among the nodes in the document graph 115. A key-value grouping includes any combination of: (a) one or more keys, and (b) one or more values associated with the keys.

According to one embodiment, the key-value grouping is a question-answer grouping. The question includes one or more sentences corresponding to one or more nodes. The answer includes one or more sentences corresponding to one or more nodes. The question-answer grouping includes the grouping of one or more sentences answering the question.

The GNN engine 111 includes a graph neural network training engine 112 to train the graph neural network 113. The GNN training engine 112 obtains a training data set 121 from a data repository 120. The training data set 121 includes at least one of documents 122 and document graphs 123. The documents 122 and/or document graphs 123 are labeled with nodes and edges specifying groupings of grammatical structure elements that correspond to key-value pairs. For example, the documents 122 and/or document graphs 123 may be labeled with nodes and edges specifying which sentences in a document 122 belong to particular question/answer pairs.

The document graphs 123 include data obtained from node and edge attributes in the documents 122. For example, as discussed previously, node attributes include: text font, text content, text style, text weight, text size, and a location, in a coordinate system, of text in the document. Edge attributes include, for a pair of nodes, differences in text size, text font, text color, and text style, differences in a page on which the text is located, a relative read order of one node to another node, and a relative layout of one node compared to another node.

The GNN engine 111 uses a machine learning algorithm to categorize nodes in a document graph 115 as corresponding to key-value pair groupings, and edges in the document graph 115 as connecting nodes belonging to a same key-value pair grouping. A machine learning algorithm is an algorithm that can be iterated to learn a target model f that best maps a set of input variables to an output variable, using a set of training data. A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, back-propagation, and/or clustering.

In an embodiment, a set of training data 121 includes datasets and associated labels. The datasets are associated with input variables (e.g., node attributes and edge attributes) for the target model f. The associated labels are associated with the output variable (e.g., node classifications and edge classifications) of the target model f. The training data may be updated based on, for example, feedback on the accuracy of the current target model f. Updated training data is fed back into the machine learning algorithm, which in turn updates the target model f.

The GNN training engine 112 trains the GNN 113 with the training data set 121, including node and edge attributes, to predict node classifications and edge classifications. Node classifications include: key, value, and other. According to an example embodiment, the GNN 113 classifies question/answer type key/value pairs. For example, the GNN 113 assigns to a key-type node a classification "question," assigns to a value-type node a classification "answer," and assigns to a node that is neither a key-type node nor a value-type node a classification "other." Edge labels include a positive-type edge and a negative-type edge. A positive-type edge connects two nodes of a same key-value pair grouping. A negative-type edge connects two nodes that are not part of the same key-value pair grouping. In an example in which a question-answer grouping includes one question node A and two answer nodes B and C, edges connecting nodes A and B and B and C are both positive-type nodes. An edge connecting node C with another node, D, is a negative-type node.

A machine learning algorithm generates a target model f such that the target model f best fits the datasets 121 of training data to the labels of the training data. Additionally, or alternatively, a machine learning algorithm generates a target model f such that when the target model f is applied to the datasets 121 of the training data, a maximum number of results determined by the target model f matches the labels of the training data.

In an example, the GNN training engine 112 initially trains a graph neural network 113 using a training data set 121. Training the graph neural network includes generating values in neurons of n hidden layers for the graph neural network and the functions/weights applied to each hidden layer to compute the neuron values for the next hidden layer. The training may further include determining the functions/weights to be applied to the final, n-th hidden layer that compute the final predictions for a data point.

The GNN training engine 112 trains the GNN 113 to classify nodes and edges by generating embeddings representing the nodes and edges. While input embeddings representing the nodes and edges include vectors representing defined and measurable values, such as a font size or a node position, the GNN 113 generates embeddings comprising vectors representing both specific categories and un-measurable values representing learned correlations between nodes. For example, while one vector of a node embedding generated by the GNN 113 may include a classification as a question-type node or answer-type node, the node embedding generated by the GNN 113 may include tens or hundreds of additional vectors which do not directly correspond to classifications or measurable values. Instead, these vectors include learned values representing relationships among attributes of nodes in a document graph 115. According to one embodiment, these vectors which do not directly correspond to classifications or measurable values are represented within hidden layers of the GNN 113. The GNN 113 may output values identifying key-value pair groupings of nodes without outputting all the vectors of the embeddings representing the nodes. Upon initiating training of the GNN 133, the parameters of the GNN 113 are set to random values, such that the corresponding classifications for nodes and edges are random. As the GNN training engine 112 trains the GNN 113 on the training data set 121, the GNN training engine 112 iteratively adjusts the parameters of the GNN 113 to improve the accuracy of the GNN 113 in predicting key-type nodes, value-type nodes, and positive-type edges connecting nodes in key-value pair groupings.

Training a neural network includes: (a) obtaining a training data set 121, (b) iteratively applying the training data set to a graph neural network to generate labels, or classification values, for data points (representing nodes and edges of a document graph) of the training data set, and (c) adjusting weights and offsets associated with the formulae that make up the neurons of the graph neural network based on a loss function that compares values associated with the generated labels to values associated with test labels. The neurons of the graph neural network include activation functions to specify bounds for a value output by the neurons. The activation functions may include differentiable nonlinear activation functions, such as rectified linear activation (ReLU) functions, logistic-type functions, or hyperbolic tangent-type functions. Each neuron receives the values of each neuron of the previous layer, applies a weight to each value of the previous layer, and applies one or more offsets to the combined values of the previous layer. The activation function constrains a range of possible output values from a neuron. A sigmoid-type activation function converts the neuron value to a value between 0 and 1. A ReLU-type activation function converts the neuron value to 0, if the neuron value is negative, and to the output value if the neuron value is positive. The ReLU-type activation function may also be scaled to output a value between 0 and 1. For example, after applying weights and an offset value to the values from the previous layer for one neuron, the system may scale the neuron value to a value between −1 and +1. The system may then apply the ReLU-type activation function to generate a neuron output value between 0 and 1. The system trains the graph neural network using the training data set, a test data set, and a verification data set until the labels generated by the trained neural network are within a specified level of accuracy, such as 98% accuracy.

According to one embodiment, the GNN training engine 112 trains the GNN 113 using a graph convolutional kernel which (a) takes as input data (i) node attributes and (ii) edge attributes, (b) learns relationships among attributes of nodes, and (c) generates embeddings representing the nodes and edges which aggregate attributes of neighboring nodes and edges into an embedding for a particular node or edge, and which learns different weights to attribute to the neighboring nodes and edges based on relationships between the neighboring nodes and edges and a particular node.

The content retrieval platform 110 stores the trained graph neural network 113. When the query execution engine identifies a particular document 131 including content matching query terms, the document graph generating engine generates a document graph of the document. The GNN engine 111 applies the GNN 113 to the document graph. The GNN 113 generates output values classifying nodes and edges as belonging to key-value pair groupings.

A document graph decoder 116 identifies key-value pair groupings based on the labels generated by the GNN 113. For each edge labeled with a "negative" type label by the GNN 113, the document graph decoder 116 removes the edge from the document graph. The remaining edges include only edges belonging to key-value pair groupings. The document graph decoder 116 further extracts components containing at least two nodes. In other words, isolated nodes which were not connected by edges to other nodes are omitted from the decoded document graph. The document graph decoder 116 analyzes the node labels generated by the GNN 113 to identify, in each key-value pair grouping, the group of one or more nodes that comprise the key-portion and the group of one or more nodes that comprise the value-portion.

The query execution engine 117 identifies the key-value pair grouping, from among the nodes and key-value pair groupings in the document graph 115, which includes the content matching query terms. The query execution engine 117 presents content from the key-value pair grouping on the user interface 118 in response to the query. For example, the query execution engine 117 may identify content matching query terms in a key-type node of a key-value pair grouping. The query execution engine 117 presents content from a value-type node in the same key-value pair grouping as the key-type node in response to the query.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

In one or more embodiments, the content retrieval platform 110 refers to hardware and/or software configured to perform operations described herein for (a) executing queries, (b) applying document graph data to a GNN to classify content in documents, and (c) generating query responses based on the content classifications. Examples of operations for identifying key-value pair groupings in documents using a GNN are described below with reference to FIG. 2.

In an embodiment, the content retrieval platform 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interface 118 refers to hardware and/or software configured to facilitate communications between a user and the content retrieval platform 110. Interface 118 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 118 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface xyz is specified in one or more other languages, such as Java, C, or C++.

Figure 2:
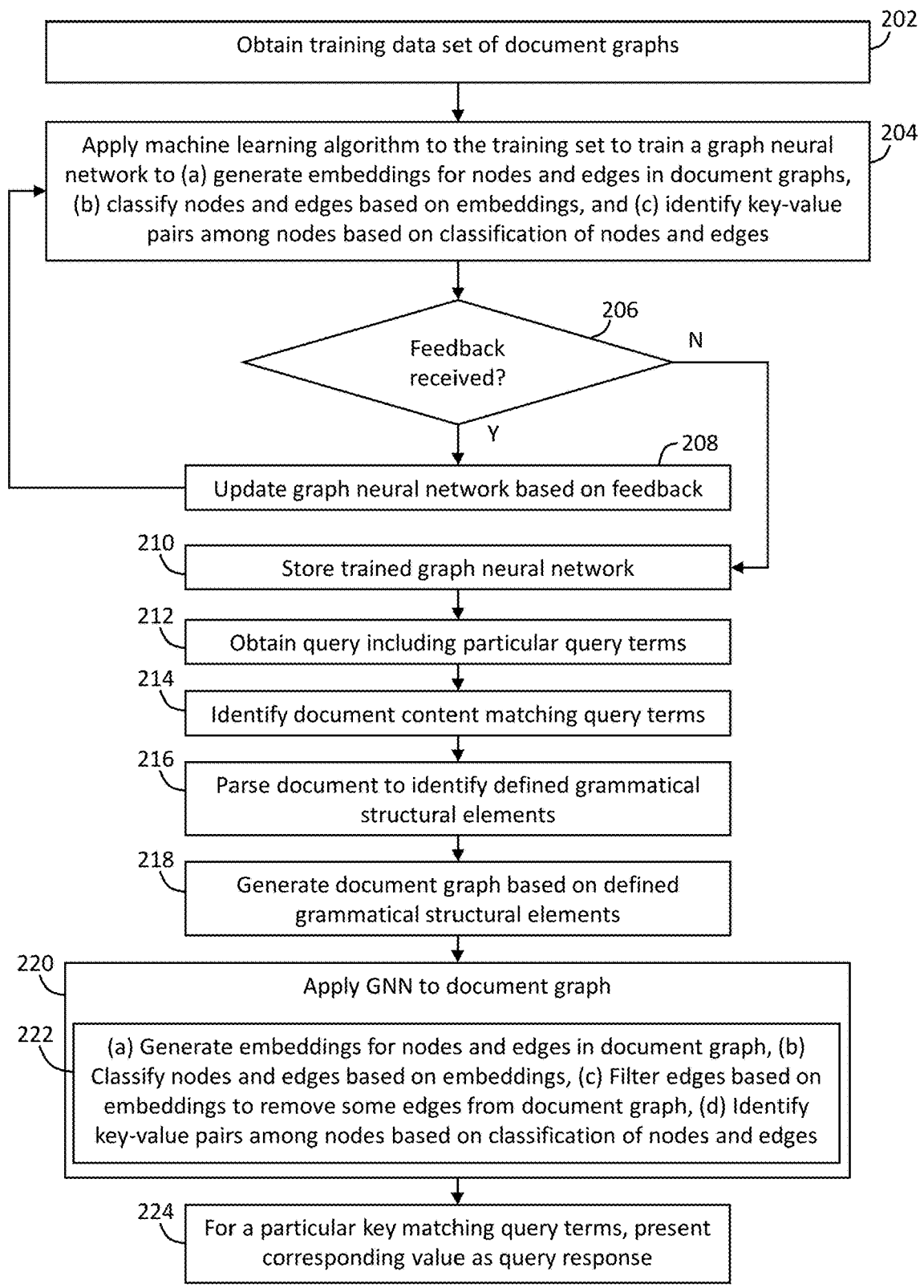
FIG. 2 illustrates an example set of operations for identifying key-value pair groupings in documents using a graph neural network in accordance with one or more embodiments.

3. Identifying Key/Value Pair Groupings in Documents Using a Graph Neural Network FIG. 2 illustrates an example set of operations for identifying question/answer pair groupings in documents using a graph neural network (GNN) in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system obtains a training data set of document graphs (Operation 202). The document graphs correspond to documents. A particular document graph associated with a particular document identifies grammatical structural elements within the document. The document graph labels particular grammatical structural elements as nodes. The document graph connects nodes with edges. The nodes and edges are characterized by particular attributes. Node attributes include text font, text content, text style, text weight, text size, and a location, in a coordinate system, of text in the document. Edge attributes include, for a pair of nodes, differences in text size, text font, text color, and text style, differences in a page on which the text is located, a relative read order of one node to another node, and a relative layout of one node compared to another node.

The training data set includes labels associated with nodes and edges. The labels classify the nodes as a key, a value associated with the key, or "other," meaning the node is neither a key nor a value. According to an example embodiment, the nodes are sentences. The labels classify the nodes as sentences belonging to questions, belonging to answers, and "other," indicating the node belongs to neither a question nor an answer.

The system applies a machine learning algorithm to training data set to train a graph neural network to (a) generate embeddings for nodes and edges in document graphs, (b) classify nodes and edges based on embeddings, and (c) identify key-value pairs among nodes based on classification of nodes and edges (Operation 204). The machine learning algorithm analyzes the training data set to identify data and patterns that indicate relationships between nodes of a document graph. Types of machine learning models include, but are not limited to, linear regression, logistic regression, linear discriminant analysis, classification and regression trees, naïve Bayes, k-nearest neighbors, learning vector quantization, support vector machine, bagging and random forest, boosting, backpropagation, and/or clustering.

Training the graph neural network includes initializing model parameters to generate random values for predictions associated nodes and edges in a document graph. In other words, the output of the graph neural network associated with a first document graph in the training data set results in random predictions whether nodes and edges are associated with key-type nodes, value-type nodes, positive-type edges, negative-type edges, or a same key-value pair grouping. As the training progresses, the system iteratively adjusts model parameters based on a loss function indicating an accuracy of predictions to generate more accurate predictions. The system iteratively generates predictions and adjusts model parameters based on the predictions until an accuracy of the graph neural network achieves a specified level, such as 98%.

In examples of supervising machine learning algorithms, the system may obtain feedback on the whether a particular classification as a key, a value, "other," a positive-type edge, or a negative-type edge, or a particular grouping of a node or edge in a particular key-value pair grouping is correct (Operation 206). The feedback may affirm that a particular classification or grouping is correct. In other examples, the feedback may indicate that a particular classification or grouping is incorrect. Based on the feedback, the machine learning training set may be updated, thereby improving its analytical accuracy (Operation 208). Once updated, the system may further train the machine learning model by optionally applying the model to additional training data sets.

Upon completion of the training, such as by determining whether a model has achieved a desired accuracy level, the system stores the graph neural network (GNN) (Operation 210).

The system obtains a query including particular query terms (Operation 212). The system may receive the query via a user interface. The user interface may include a voice-recognition interface. Accordingly, a user may speak a question or a set of terms. The system may generate the query based on the spoken question or terms. In addition, or in the alternative, the interface may include a text interface. A user may input text content into the text interface. According to yet another example, the system may monitor user actions on a computer to automatically generate queries based on the user actions. For example, a user may enter search terms into a web browser. The system may identify the search terms and generate a query to access content in a data store which is not connected to the web browser.

The system identifies document content matching query terms (Operation 214). The document includes key-value pairs. The content matching the query terms is located within one or more key-value pair groupings. The content matching the query terms may be located within a key-type content of a key-value pair grouping. The key-value pair grouping may be a question (key)-answer(value) pair grouping. The content matching the query terms may be located in a question portion of a question-answer pair grouping. The document may be a frequently-asked-questions (FAQ) document. The format of the document may be such that a value associated with a key does not immediately follow the key. For example, in a FAQ document, an answer may not immediately follow its question in a reading order of the document. An answer may be located beside or below its corresponding question. An answer may be in a same font or a different font from its corresponding question.

The system parses the document to identify defined grammatical structural elements (Operation 216). Examples of defined grammatical structural elements include phrases, sentences, and lists. According to one example, the system identifies sentences, lists, logos, page numbers, dates, document titles, geographic addresses, and website addresses in the document. For example, the system may not identify phrases within the document as separate grammatical structural elements when the phrases are located within sentences. However, the system may identify phrases within the document as separate grammatical structural elements when the phrases are not contained within a sentence. In the description which follows, sentences will be used to describe defined grammatical structural elements. However, embodiments are not limited to identifying sentence-type grammatical structural elements. Instead, a system may be configured to identify any type of grammatical structural element (e.g., sentences, phrases, lists, dates, titles, numbers, addresses), or combination of grammatical structural elements.

The system generates a document graph based on sentences identified in the document (Operation 218). The system generates a separate node for each sentence. In addition, the system generates a node for other grammatical elements which are not part of a sentence-type grammatical structure, such as: a page number, a date, a web address, a document title, a document subtitle, and a list of items in non-sentence format.

The system generates edges connecting the nodes. The system generates an initial set of edges based on distances between nodes. According to one example, the system compares a coordinate position of a particular node with the coordinate positions of nodes located above, below, and to the sides of the particular node. If the nodes are within a predefined distance of each other, in the horizontal and/or vertical directions, the system generates an edge connecting the nodes.

In addition, or in the alternative, system generates edges between any two nodes within a defined reading order of each other. The system generates an edge between a center node and a particular number of nodes preceding and following the center node in a reading order of the document. According to one embodiment, determining a position of a node within a document includes determining, in a coordinate system, (a) a position of a right edge of the grammatical element corresponding to the node, (b) a position of a left edge of the grammatical element corresponding to the node, (c) a position of a bottom edge of the grammatical element corresponding to the node, and (d) a position of a top edge of the grammatical element corresponding to the node.

In addition, or in the alternative, system may generate edges between two nodes based, in part, on semantic content in the nodes. For example, system may generate an edge between two nodes having two or more subject-type words in common. As another example, system may generate an edge between two nodes having at least one word in common that is also a match to a received query term.

The nodes and edges are embeddings comprising n vectors for the nodes and m vectors for the edges. Values represented by vectors in the nodes include text content, font weight (such as regular, italic, bold, combinations of bold and italic, etc.), and the location in the page of the sentence (such as the coordinates corresponding to the left, right, top, and bottom edges of the sentence in the document). Edges represent relationships between nodes. Values represented by vectors in the edges include relative relationships between: font size (is a font size of one node greater, equal to, or less than the font size of the other node), font color (is the font size of one node the same, or different from, the font size of the other node), a page (are two nodes on the same page or different pages), a relative reading order of the nodes (is one node in a reading order position preceding, or following, the other node), and a relative layout of the nodes (what is the difference between (a) the left edges of the nodes, (b) the right edges of the nodes, (c) the tops of the nodes, and (d) the bottoms of the nodes, and what are the horizontal and vertical distances between the nodes (e.g., what is a difference between the left side of one node and the right side of the other node)).

The system applies the trained GNN to the document graph (Operation 220). Applying the GNN to the document graph includes classifying nodes and edges based on embeddings (Operation 222). The GNN classifies nodes as key-type nodes, value-type nodes, or "neither"-type nodes, indicating the node is neither a key-type node nor a value-type node. The GNN classifies edges as either positive-type edges or negative-type edges. Positive-type edges connect two nodes of a same key-value pair grouping. Negative-type edges connect two nodes that are not part of the same key-value pair grouping. For example, a document graph may include two question-answer pairs and four nodes which do not belong to the two question-answer pairs. The GNN outputs data classifying the question-type nodes of the question-answer pairs, the answer-type nodes of the question-answer pairs, and the edges connecting the question and answer-type nodes within the same question-answer pair grouping. If the document graph includes an edge connecting a node from one question-answer pair grouping to a node of the other question-answer pair grouping, the GNN classifies this edge as a negative-type edge.

In one or more embodiments, the system filters particular edges out from the document graph based on the GNN classifications. The system may identify edges which have been labeled with a negative-type label by the GNN, indicating the edges do not connect two nodes in a same key-value pair grouping. Upon filtering from the document graph negative-type edges, the resulting set of nodes and edges includes only the nodes and edges that are part of key-value pair groupings and isolated nodes. The system further filters out of the document graph the isolated nodes that are not part of a key-value pair grouping. The system further identifies, for each key-value pair grouping, the nodes labeled as key-type nodes by the GNN and the nodes labeled as value-type nodes by the GNN.

The system presents a portion of an identified key-value pair grouping in response to the query (Operation 224). For example, the system may identify content, within a key-type node of a key-value pair grouping, which matches one or more query terms. The system may present a value-type node (e.g., text content which makes up the text of the value-type node) in response to the query. In addition, or in the alternative, the system may present content from both (a)

the key-type node including the content matching the query terms, and (b) a value-type node associated with the key-type node.

In an example in which the key-value pair grouping is a question-answer pair grouping, the system may identify content in the a question that matches one or more query terms. The system may present a corresponding answer from the document in response to the query.

While an example is described above in which a system identifies content matching query terms in a document and subsequently generates a document graph, according to an alternative embodiment, a system may generate document graphs for a set of documents. The system may apply a GNN to the document graphs to identify key-value groupings in the documents. In response to a query, the system may search the stored documents, identify content in the previously-identified key-value groupings, and return content from the previously-identified key-value groupings.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
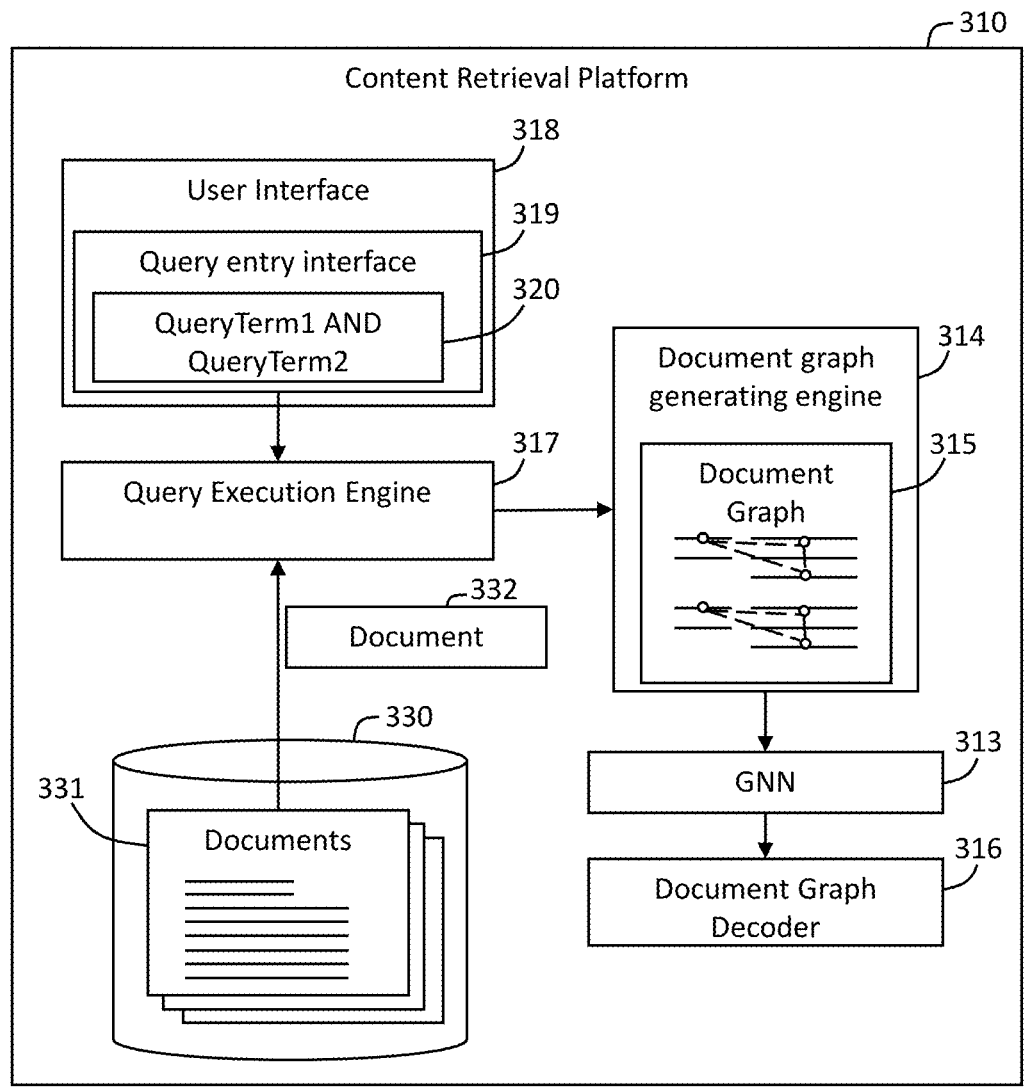
FIGS. 3A-3C illustrate an example set of operations for in accordance with one or more embodiments.

FIG. 3A illustrates a content retrieval platform 310 for presenting answers in response to queries. The platform 310 includes a user interface 318, a query execution engine 317, a document graph generating engine 314, and a graph neural network (GNN) 313.

A user enters query terms into a field 320 of a query entry interface 319. The query execution engine 317 converts the query into a format for searching document content. For example, the query execution engine 317 may apply logical operators to query terms, identify synonyms or related terms to the query terms, and apply one or more query filters based on predefined or selected query settings.

The query execution engine 317 searches documents 331 in a data repository 330 for content matching the query terms. The query execution engine 317 identifies a document 332 including content matching the query terms. The document 332 includes text in a question-answer format. In the example illustrated in FIGS. 3A-3C, the document 332 is a frequently-asked-questions (FAQ)-type document. The document includes a text question followed by a text answer which answers the text question.

The document graph generating engine 314 generates a document graph 315 for the document 332. The document graph generating engine generates a separate node for each sentence and for page elements which are not part of sentences including: (a) a list, (b) a document title, (c) a logo, (d) a page number, (e) a document date, and (f) a web address.

The document graph generating engine 314 generates edges to connect the nodes. The document graph generating engine 314 generates an initial set of edges based on a combination of (a) a relative position, in the document, of two nodes relative to each other, and (b) a relative position, in a read order, of two nodes relative to each other. Generating the initial set of edges based on the relative position of two nodes in the document includes determining one or more of: the difference between (a) the left edges of the nodes, (b) the right edges of the nodes, (c) the tops of the nodes, (d) the bottoms of the nodes, and (e) the horizontal and vertical distances between the nodes (e.g., the difference between the left side of one node and the right side of the other node, and/or the difference between the bottom side of one node and the top side of another node).

Generating the initial set of edges based on the relative position of two nodes in a read order of the document includes: (a) determining a read order of the document, including left-to-right, top-to-bottom, and from a bottom of one column or page to a top of a next column or page, (b) identifying a defined number of nodes preceding a target node in read order, and (c) identifying a defined number of nodes following the target node in the read order.

Figure 3B:
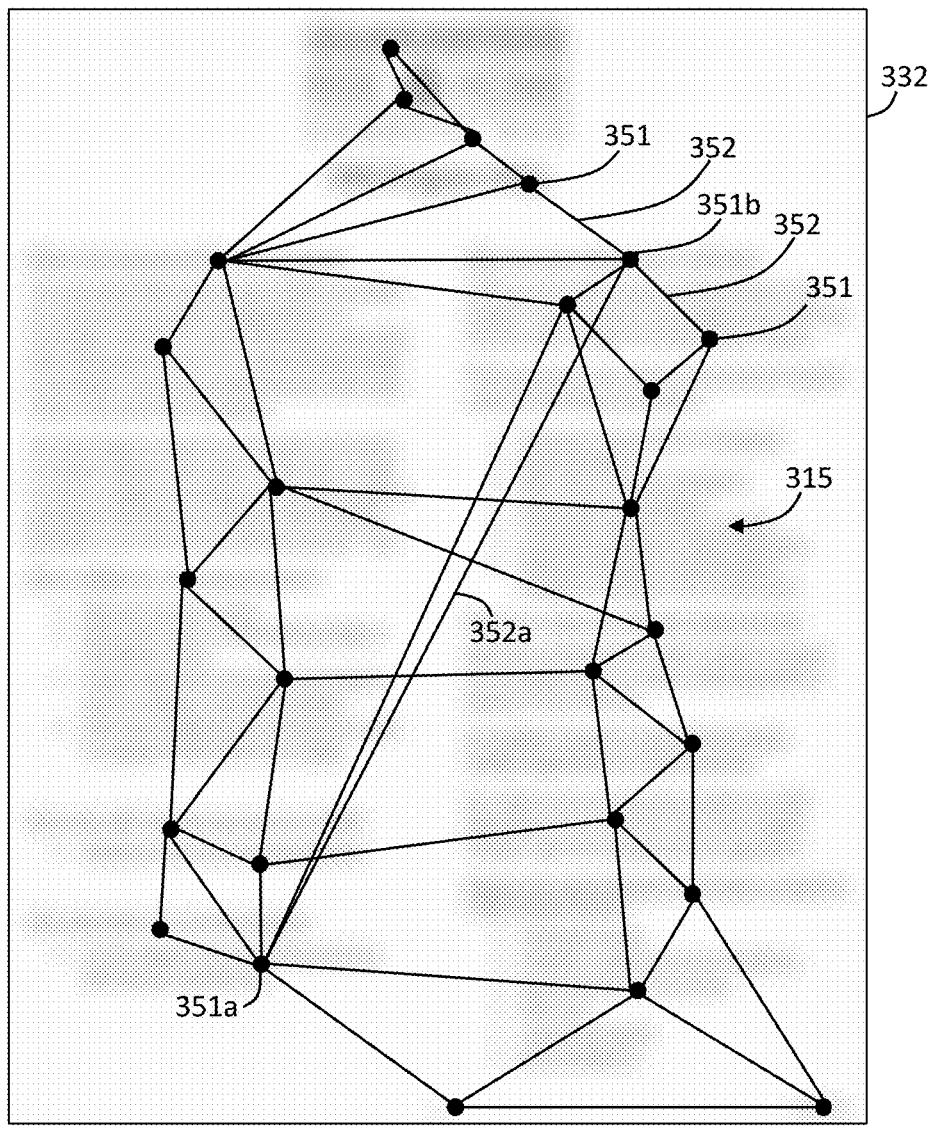

FIG. 3B illustrates the document graph 315 generated for the document 332 including the initial set of edges 352 based on node coordinate position and node read order position. The document graph 315 includes nodes 351 and edges 352. Each dot in FIG. 3B represents a separate node. Each line represents a separate edge. For example, the document graph generating engine 314 generates an edge 352a between nodes 351a and 351b based on the sentence represented by node 351b following the sentence represented by node 351a in a read order (continuing from one column in the document to the next column in the document).

The edges 352 represent relationships between nodes. Values represented by vectors in the edges include relative relationships between: font size (is a font size of one node greater, equal to, or less than the font size of the other node), font color (is the font size of one node the same, or different from, the font size of the other node), a page (are two nodes on the same page or different pages), a relative reading order of the nodes (is one node in a reading order position preceding, or following, the other node), and a relative layout of the nodes (what is the difference between (a) the left edges of the nodes, (b) the right edges of the nodes, (c) the tops of the nodes, and (d) the bottoms of the nodes, and what are the horizontal and vertical distances between the nodes (e.g., what is a difference between the left side of one node and the right side of the other node)).

Figure 3C:
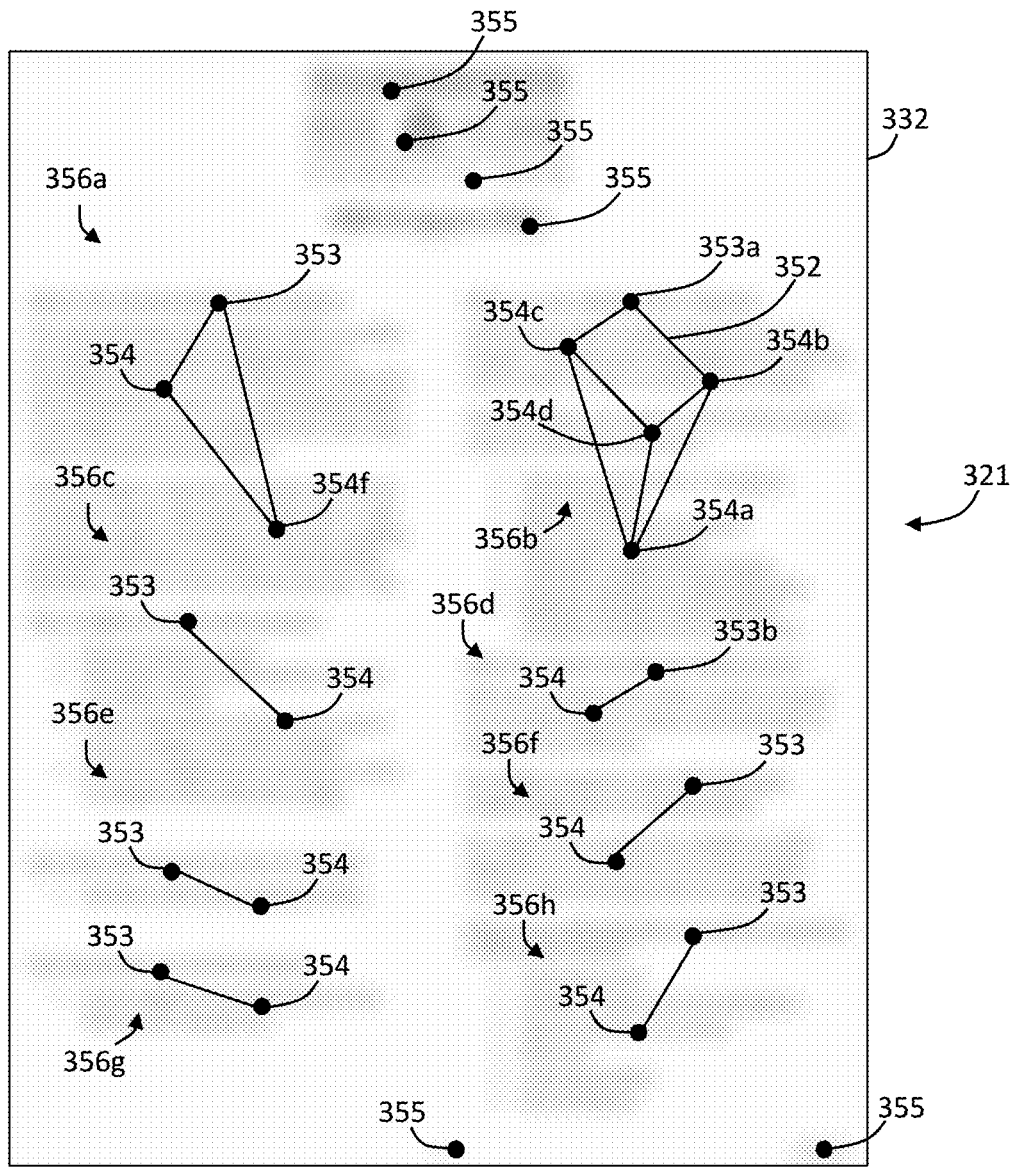

The GNN 313 identifies question-answer pair groupings 356a-356h in the document 332. The GNN 313 receives as input data the document graph 315 including the embeddings for the nodes 351 and the edges 352. The GNN 313 generates labels classifying the nodes 351 as question-type nodes, answer-type nodes, or "other"-type nodes, which are neither question-type nodes nor answer-type nodes. In the example illustrated in FIG. 3C, the nodes 353 are classified as question-type nodes, the nodes 354 are classified as answer-type nodes, and the nodes 355 are classified as "other"-type nodes. The GNN 313 generates labels classifying the edges 352 as positive-type edges or negative-type edges. Positive-type edges connect two nodes belonging to the same question-answer pair grouping. Referring to FIG. 3C, the edges connecting nodes 353a, 354c, 354b, 354d, and 354a are all connected to nodes of the same question-answer pair grouping 356b. In contrast, the edges, illustrated in FIG. 3B, connecting node 354a to nodes 353b and 354f do not connect nodes of a same question-answer pair grouping.

Based on the classification labels for the nodes 351 and edges 352 generated by the GNN 313, the document graph decoder 316 filters the nodes and edges in the document graph 315 to generate a filtered document graph 321 including only nodes and edges that are part of question-answer pair groupings. The document graph decoder 316 removes from the filtered document graph 321 edges labeled as negative-type edges, by the GNN 313. For example, the document graph decoder 316 omits from the filtered document graph 321 the edges, illustrated in FIG. 3B, connecting node 354a to nodes 353b and 354f.

The document graph decoder 316 extracts from the modified document graph 321 groupings 356a-356h which include at least two nodes. In other words, the document graph decoder 316 refrains from extracting nodes 355 which are not connected to another node by an edge, after omitting the negative-type edges. For each question/answer pair grouping 356a-356h, the document graph decoder 316 identifies the question-type nodes and the answer-type nodes, according to the labels generated by the GNN 313.

In the embodiment illustrated in FIG. 3C, the question-answer pair grouping 356b comprising the nodes 353a and 354a-354d includes one question node 353a and multiple answer nodes 354a-354d. In addition, answer node 354a is part of the question-answer pair grouping 356b, even though it is not directly connected to the question node 353a by an edge. Instead, the grouping 356b is defined by one edge 352 connecting the question node 353a to one answer node 354b and another edge 352 connecting the answer node 354b to the answer node 354a.

Based on identifying one or more terms matching query terms in the text of the question-type node 353a, the query execution engine 317 selects one or more of the answer-type nodes 354a-354d for responding to the query. For example, a query may include the terms "when," "reimbursed," "trip," and "expense." The query execution engine 317 may identify the terms "reimbursement" "trip" and "expense" in the question associated with node 353a. Based on the GNN 313 identifying the nodes 354a-354d as answer-nodes in the question-answer grouping 356b, the query execution engine 317 searches the text associated with the answer nodes 354a-354d to identify content most closely relevant to the query terms. For example, the query execution engine 317 may identify information about when a reimbursement is received in answer node 354a and types of expenses for which a reimbursement may be received in node 354c. The query execution engine 317 may select node 354a for responding to the query. The query execution engine 317 refrains from selecting node 354c for responding to the query. According to an alternative example embodiment, the query execution engine 317 may return the content of all of the nodes 354a-354d in response to the query. According to yet another alternative example, the query execution engine 317 presents content from answer node 354a in response to the query and generates a selectable link to the rest of the content from nodes 354b-354d.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
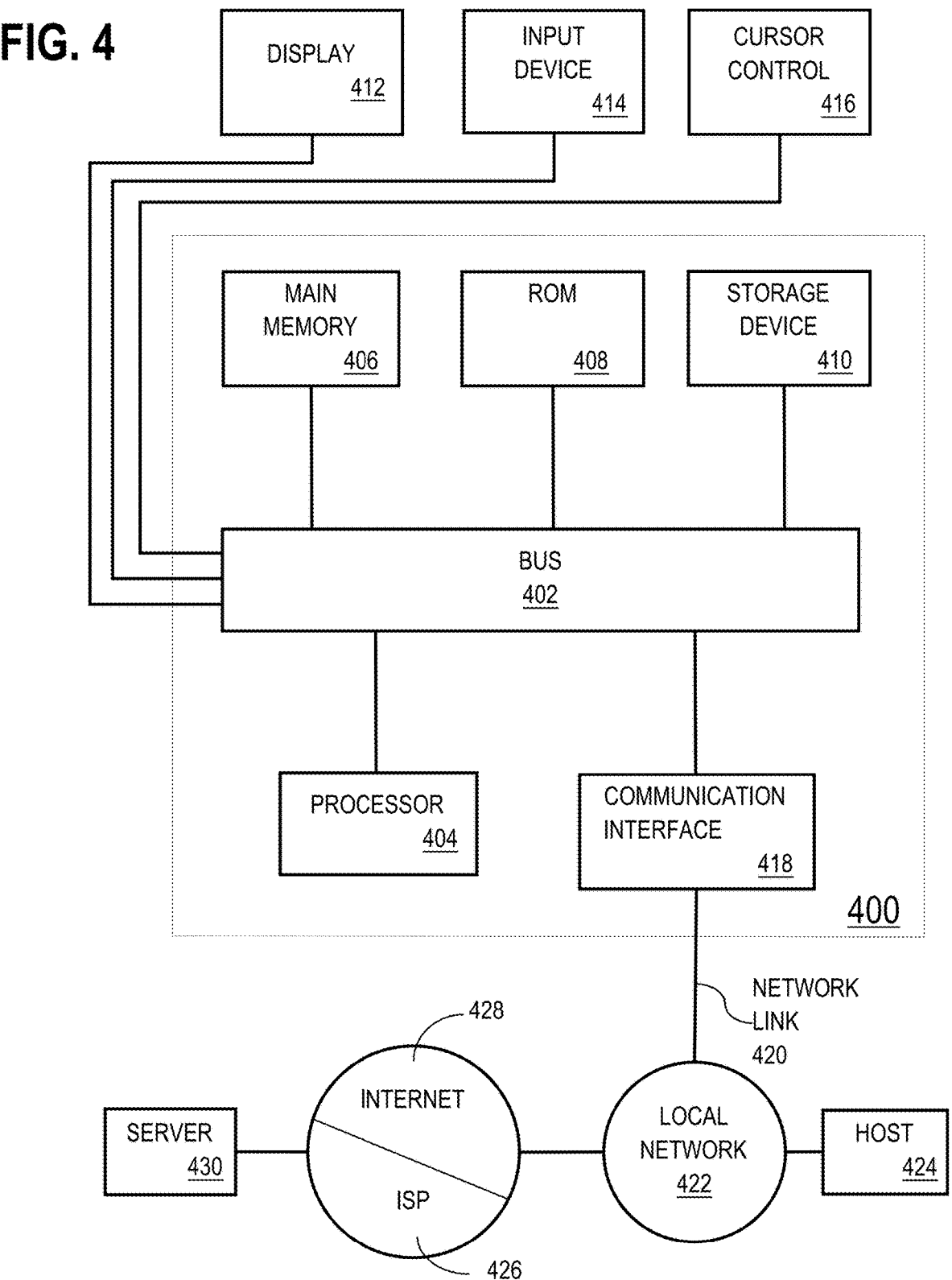
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:
    training a machine learning model to generate predictions identifying key-value pair groupings in documents, the training comprising:
        accessing a training data set of document graphs describing a corresponding set of documents, each respective document graph in the training data set comprising:
            a first node corresponding to a first grammatical element in a respective document of the set of documents, the first grammatical element corresponding to a key of a key-value pair grouping, the first node comprising a first embedding comprising a first set of vectors encoding a first set of attributes representing the first grammatical element in a first document;
            a second node corresponding to a second grammatical element in the document, the second grammatical element corresponding to a value of the key-value pair grouping, the second node comprising a second embedding comprising a second set of vectors encoding a second set of attributes representing the second grammatical element in the first document; and
            a first edge connecting the first node and the second node, the first edge comprising a third embedding comprising a third set of vectors encoding a third set of attributes representing a relationship of the first node to the second node;
        training the machine learning model based on the training data set to generate:
            based at least on values of the first set of vectors, the second set of vectors, and the third set of vectors:
                a classification of the first node as a key-type node, the second node as a value-type node, and the first edge as a positive-type edge connecting two nodes of a same key-value pair grouping;
    receiving, by a content retrieval platform, a query specifying a set of query terms;
    identifying, by the content retrieval platform, content matching the query terms in text of a target document;
    responsive to identifying content matching the query terms in the text of the target document, inputting a target document graph, representing the target document, to the trained machine learning model to identify one or more key-value pair groupings based on the target document;
    determining the content matching the query terms in the text of the target document is located in a key of a key-value pair grouping; and
    based on determining the content matching the query terms is located in the key of the key-value pair grouping: returning, by the content retrieval platform in response to the query, information from the value of the key-value pair grouping in the target document,
    wherein the key corresponds to a question in the target document, and
    wherein the value corresponds to an answer to the question in the target document.

2. The one or more non-transitory computer readable media of claim 1, wherein the operations further comprise:
    generating the target document graph at least by:
        identifying in the target document a plurality of grammatical elements;
        generating a plurality of nodes corresponding, respectively, to the plurality of grammatical elements, each respective node of the plurality of nodes including a first embedding comprising a first set of vectors that is generated based, at least in part, on attributes of the respective node; and
        generating a plurality of edges connecting the plurality of nodes, each respective edge of the plurality of edges including a second embedding comprising a second set of vectors that is generated based, at least in part, on attributes of the respective edge.

3. The one or more non-transitory computer readable media of claim 2, wherein training the machine learning model to generate predictions identifying key-value pair groupings in documents comprises training the machine learning model to identify question-answer pair groupings in the documents,
    wherein the operations further comprise:
        responsive to determining the content is in a question-type node of a particular question-answer pair grouping in the target document: presenting, in response to the query, text content from an answer-type node in the particular question-answer pair grouping.

4. The one or more non-transitory computer readable media of claim 2, wherein the first set of vectors is generated based, at least in part, on attributes of a respective grammatical element corresponding to the respective node, the attributes comprising one or more of:
    text content of the respective grammatical element; and
    font style of the respective grammatical element.

5. The one or more non-transitory computer readable media of claim 2, wherein the second set of vectors is generated based, at least in part, on attributes of a respective edge, the attributes comprising one or more of:
    a difference in font size between two nodes connected by the respective edge;
    a difference in font color between the two nodes connected by the respective edge; and
    a difference in font style between the two nodes connected by the respective edge.

6. The one or more non-transitory computer readable media of claim 1, wherein the operations further comprise:
    identifying in the target document graph a first set of one or more edges labeled by the machine learning model as negative-type edges which connect two nodes belonging to different key-value pair groupings; and responsive to identifying the one or more edges as negative-type edges, generating a filtered target document graph by removing the one or more edges from the target document graph, wherein each key-value pair grouping in the filtered target document graph is disconnected, by any edge, from every other key-value pair grouping.

7. The one or more non-transitory computer readable media of claim 1, wherein the first grammatical element and the second grammatical element are sentences.

8. The one or more non-transitory computer readable media of claim 1, wherein the first grammatical element is a question, and wherein the second grammatical element is an answer to the question.

9. The one or more non-transitory computer readable media of claim 1, wherein the key-value pair grouping includes at least:
a first question sentence corresponding to a fourth node in the target document graph;
a first answer sentence corresponding to a fifth node in the target document graph; and
at least one second answer sentence corresponding to a sixth node in the target document graph,
wherein the content matching the query terms is located in the first question sentence.

10. The one or more non-transitory computer readable media of claim 9, wherein the target document graph comprises:
a first edge connecting the fourth node to the fifth node; and
a second edge connecting the fifth node to the sixth node, wherein the target document graph does not include any edge connecting the fourth node to the sixth node.

11. The one or more non-transitory computer readable media of claim 1, wherein the machine learning model is a graph neural network (GNN).

12. A method comprising:
training a machine learning model to generate predictions identifying key-value pair groupings in documents, the training comprising:
accessing a training data set of document graphs describing a corresponding set of documents, each respective document graph in the training data set comprising:
a first node corresponding to a first grammatical element in a respective document of the set of documents, the first grammatical element corresponding to a key of a key-value pair grouping, the first node comprising a first embedding comprising a first set of vectors encoding a first set of attributes representing the first grammatical element in a first document;
a second node corresponding to a second grammatical element in the document, the second grammatical element corresponding to a value of the key-value pair grouping, the second node comprising a second embedding comprising a second set of vectors encoding a second set of attributes representing the second grammatical element in the first document; and
a first edge connecting the first node and the second node, the first edge comprising a third embedding comprising a third set of vectors encoding a third set of attributes representing a relationship of the first node to the second node;

training the machine learning model based on the training data set to generate:
based at least on values of the first set of vectors, the second set of vectors, and the third set of vectors:
a classification of the first node as a key-type node, the second node as a value-type node, and the first edge as a positive-type edge connecting two nodes of a same key-value pair grouping;

receiving, by a content retrieval platform, a query specifying a set of query terms;

identifying, by the content retrieval platform, content matching the query terms in text of a target document;

responsive to identifying content matching the query terms in the text of the target document, inputting a target document graph, representing the target document, to the trained machine learning model to identify one or more key-value pair groupings based on the target document;

determining the content matching the query terms in the text of the target document is located in a key of a key-value pair grouping; and based on determining the content matching the query terms is located in the key of the key-value pair grouping: returning, by the content retrieval platform in response to the query, information from the value of the key-value pair grouping in the target document, wherein the key corresponds to a question in the target document, and wherein the value corresponds to an answer to the question in the target document.

13. The method of claim 12, further comprising:
generating the target document graph at least by:
identifying in the target document a plurality of grammatical elements;
generating a plurality of nodes corresponding, respectively, to the plurality of grammatical elements, each respective node of the plurality of nodes including a first embedding comprising a first set of vectors that is generated based, at least in part, on attributes of the respective node; and
generating a plurality of edges connecting the plurality of nodes, each respective edge of the plurality of edges including a second embedding comprising a second set of vectors that is generated based, at least in part, on attributes of the respective edge.

14. The method of claim 13, wherein training the machine learning model to generate predictions identifying key-value pair groupings in documents comprises training the machine learning model to identify question-answer pair groupings in the documents,
wherein the method further comprises:
responsive to determining the content is in a question-type node of a particular question-answer pair grouping in the target document: presenting, in response to the query, text content from an answer-type node in the particular question-answer pair grouping.

15. The method of claim 13, wherein the first set of vectors is generated based, at least in part, on attributes of a respective grammatical element corresponding to the respective node, the attributes comprising one or more of:
text content of the respective grammatical element; and
font style of the respective grammatical element.

16. The method of claim 13, wherein the second set of vectors is generated based, at least in part, on attributes of a respective edge, the attributes comprising one or more of:
a difference in font size between two nodes connected by the respective edge;

a difference in font color between the two nodes connected by the respective edge; and a difference in font style between the two nodes connected by the respective edge.

17. The method of claim 12, further comprising:
identifying in the target document graph a first set of one or more edges labeled by the machine learning model as negative-type edges which connect two nodes belonging to different key-value pair groupings; and
responsive to identifying the one or more edges as negative-type edges, generating a filtered target document graph by removing the one or more edges from the target document graph,
wherein each key-value pair grouping in the filtered target document graph is disconnected, by any edge, from every other key-value pair grouping.

18. The method of claim 12, wherein the first grammatical element and the second grammatical element are sentences.

19. The method of claim 12, wherein the first grammatical element is a question, and
wherein the second grammatical element is an answer to the question.

20. The method of claim 12, wherein the key-value pair grouping includes at least:
a first question sentence corresponding to a fourth node in the target document graph;
a first answer sentence corresponding to a fifth node in the target document graph; and
at least one second answer sentence corresponding to a sixth node target document graph.

21. A system comprising:
one or more processors; and
memory storing instructions that, when executed by the one or more processors, cause the system to perform:
training a machine learning model to generate predictions identifying key-value pair groupings in documents, the training comprising:
accessing a training data set of document graphs describing a corresponding set of documents, each respective document graph in the training data set comprising:
a first node corresponding to a first grammatical element in a respective document of the set of documents, the first grammatical element corresponding to a key of a key-value pair grouping, the first node comprising a first embedding comprising a first set of vectors encoding a first set of attributes representing the first grammatical element in a first document;
a second node corresponding to a second grammatical element in the document, the second grammatical element corresponding to a value of the key-value pair grouping, the second node comprising a second embedding comprising a second set of vectors encoding a second set of attributes representing the second grammatical element in the first document; and
a first edge connecting the first node and the second node, the first edge comprising a third embedding comprising a third set of vectors encoding a third set of attributes representing a relationship of the first node to the second node;
training the machine learning model based on the training data set to generate:
based at least on values of the first set of vectors, the second set of vectors, and the third set of vectors:
a classification of the first node as a key-type node, the second node as a value-type node, and the first edge as a positive-type edge connecting two nodes of a same key-value pair grouping;
receiving, by a content retrieval platform, a query specifying a set of query terms;
identifying, by the content retrieval platform, content matching the query terms in text of a target document;
responsive to identifying content matching the query terms in the text of the target document, inputting a target document graph, representing the target document, to the trained machine learning model to identify one or more key-value pair groupings based on the target document;
determining the content matching the query terms in the text of the target document is located in a key of a key-value pair grouping; and
based on determining the content matching the query terms is located in the key of the key-value pair grouping: returning, by the content retrieval platform in response to the query, information from the value of the key-value pair grouping in the target document,
wherein the key corresponds to a question in the target document, and
wherein the value corresponds to an answer to the question in the target document.

* * * * *